Feb. 25, 1936.    C. L. DENNIS    2,032,202
TESTING MACHINE
Filed Dec. 27, 1934    2 Sheets-Sheet 1

WITNESSES

INVENTOR
Calvin L. Dennis
BY
ATTORNEYS

Feb. 25, 1936.  C. L. DENNIS  2,032,202
TESTING MACHINE
Filed Dec. 27, 1934  2 Sheets-Sheet 2
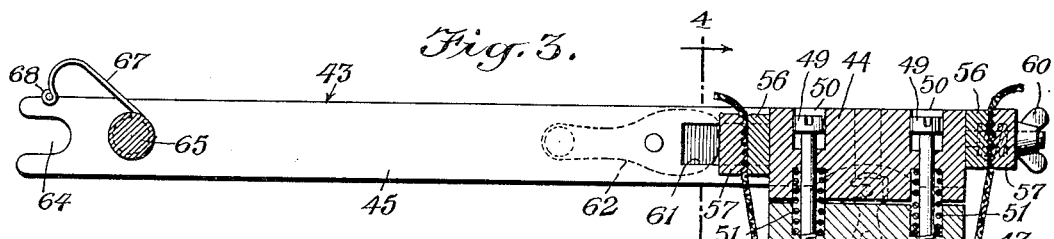
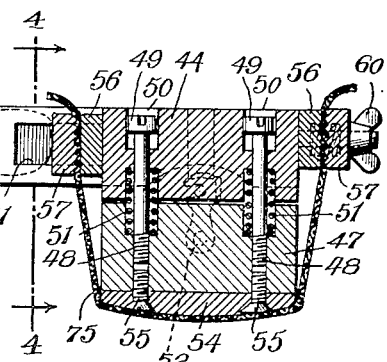
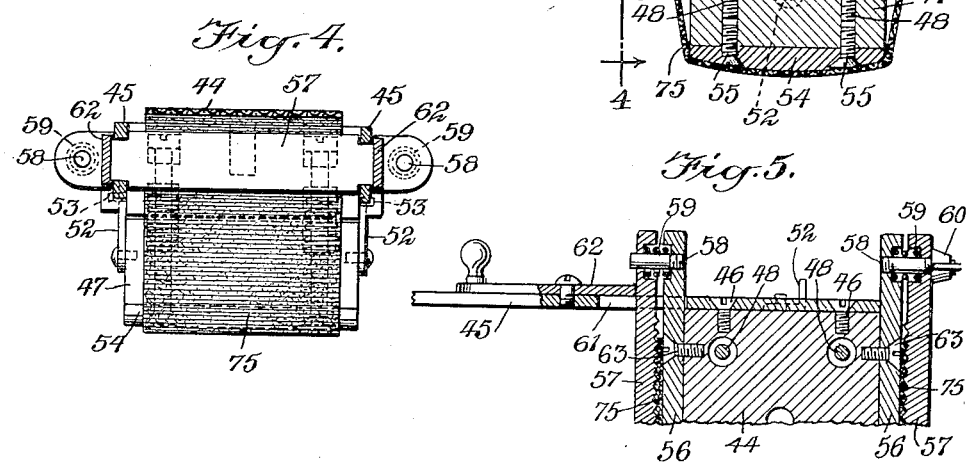
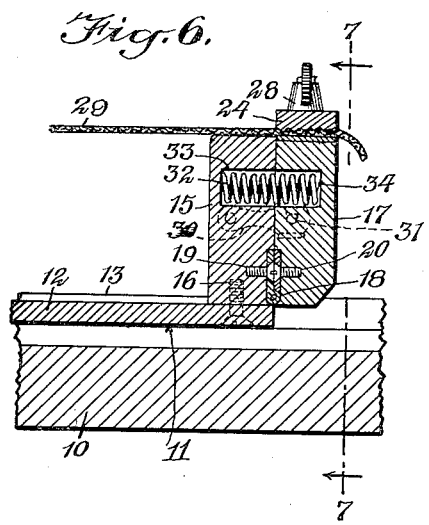
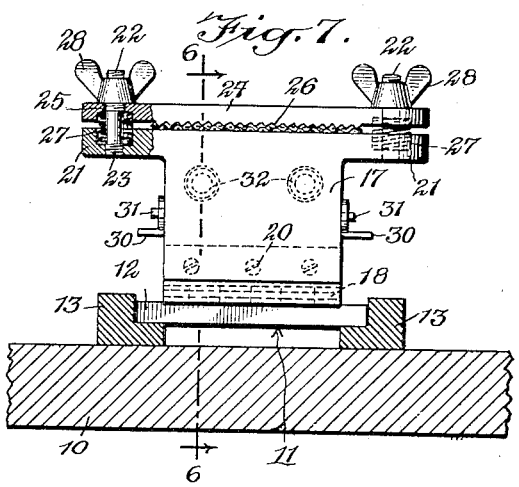
WITNESSES
INVENTOR
Calvin L. Dennis
BY
ATTORNEYS Patented Feb. 25, 1936

2,032,202

UNITED STATES PATENT OFFICE 2,032,202

TESTING MACHINE

Calvin L. Dennis, Glen Ridge, N. J.

Application December 27, 1934, Serial No. 759,416

5 Claims. (Cl. 73—51)

This invention relates to a testing machine which may be used for testing the wear-resisting quality of various materials, and which may be used advantageously for testing textile fabrics, leather, and other closely analogous materials.

An object of the invention is the provision of improvements in a machine of the indicated character whereby pieces of material to be tested are subjected to stress and frictional action to ascertain the wear-resisting quality of the material.

Another object of the invention is the provision of improvements in a machine of the indicated character, whereby the material may be subjected to tensile stress and to vary the stress at will.

Another object of the invention is the provision of improvements in a machine of the indicated character, whereby the securing and stressing of the test pieces in the machine, preparatory to the testing operation, may be easily and conveniently accomplished.

With the foregoing, other objects of the invention will appear from the embodiment of the invention which by way of example is described in the following specification and illustrated in the accompanying drawings, in which Fig. 1 is a longitudinal section through the machine, the section being taken approximately on the line 1—1 of Fig. 2;

Fig. 3 is a longitudinal section of one of the test piece supporting structures detached;

Fig. 4 is a section on the line 4—4 of Fig. 3;

Fig. 5 is a detail horizontal section;

Fig. 6 is a fragmentary section, the section being taken on the line 6—6 of Fig. 7;

Fig. 7 is a section taken on the line 7—7 of Fig. 6.

Figure 1:
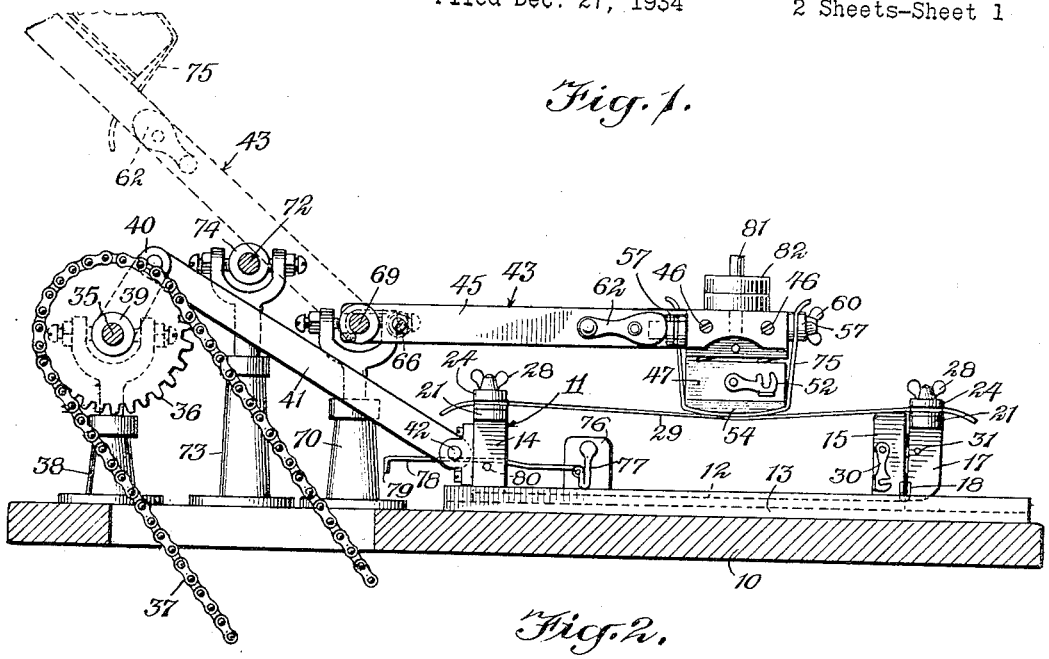
Figure 2:
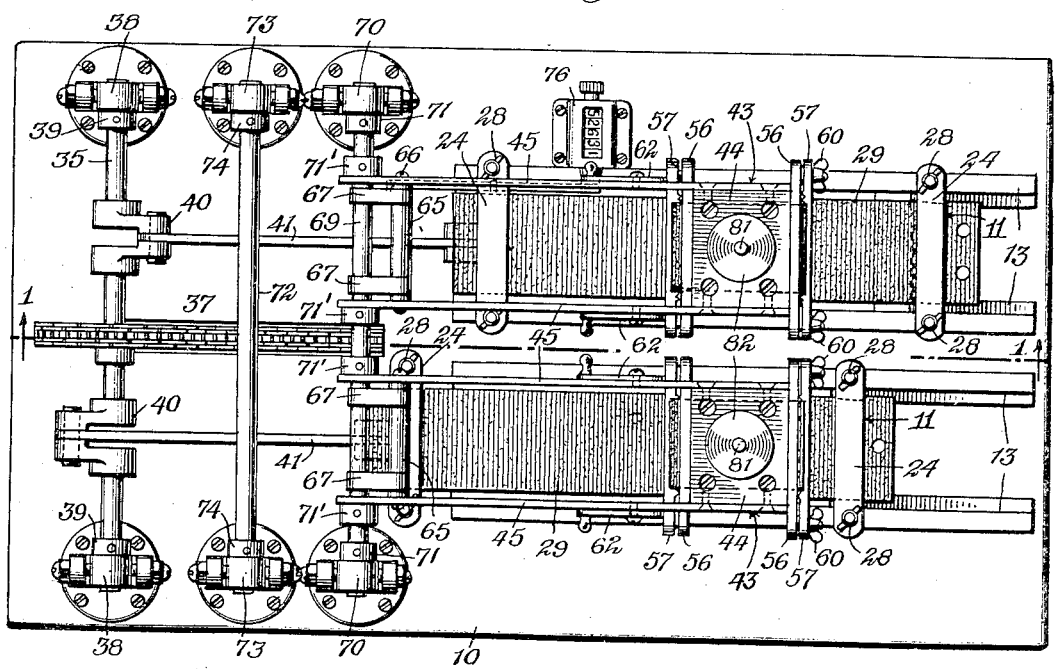
Fig. 2 is a plan view of the machine.

In the illustrated embodiment of the invention, the machine includes a plurality of similar testing units, two of these units being shown in the present instance, although any other suitable number may be employed. The testing units are arranged side by side on a suitable platform or table 10. Each of the testing units includes a reciprocal structure or carriage 11. This structure or carriage 11 includes a base or body 12 slidable between and in contact with grooved guides 13 arranged in spaced parallel relation to each other and fixedly secured to the top of the platform or table 10. The base 12 is slidable back and forth or may be reciprocated in a lineal path. Upstanding rigid supports 14 and 15 respectively are secured to the base 12 on the top thereof in spaced relation to each other transversely of the base 12 by suitable fastening elements 16. If desired the supports 14 and 15 may be formed integral with the base 12. An additional support 17 is mounted for pivotal or swinging movement with relation to the support 15 in proximity thereto. This is accomplished by the employment of a hinge 18, which has one leaf secured to the support 15 as at 19 and its other leaf secured to the support 17 as at 20, the pintle of the hinge being disposed transversely with respect to the base 10 at the lower edge of the support 17, as shown most clearly in Fig. 6. The supports 14 and 17 have co-operating means for holding a test piece of material at the ends and to maintain it under a tensile stress lengthwise thereof. The means on each of the supports 14 and 17 consists of laterally extending lugs 21 integral with the supports on the opposite sides thereof respectively. The lugs 21 are flush with the upper surface of the support. Each lug 21 has a stud or bolt 22 fixedly secured therein as at 23. Use is made of a clamping bar 24 which has holes 25 in the opposite ends thereof respectively to accommodate the studs or bolts 22. The under side of the bar 24 has a roughened or corrugated gripping surface 26 between its ends. A coiled spring 27 surrounds each of the studs or bolts 22, and the opposite ends of the spring 27 are received in recesses respectively in the related lug 21 and the bar 24. A wing nut 28 is in threading engagement with each of the studs or bolts 22 for the purpose of applying pressure to the bar 24. When the nuts 28 are unscrewed the springs 27 act to move the bar 24 upwardly away from the related support 14 or 17. As shown in the drawings a test piece of material such as fabric may be clamped at the opposite ends by means of the bars 24 under the pressure exerted thereon by the nuts 28. The bars may be elevated or be entirely removed from the studs or bolts 22 so that the opposite ends of the test piece may be arranged in contact with the supports 14 and 17 to be subsequently engaged and clamped by the bars 24. The test piece is designated 29. One end of the test piece 29 is clamped to the support 14 by the bar 24 carried thereby, after which the opposite end of the test piece 29 is subjected by any suitable means such as a weight engaged therewith to the desired tensile stress lengthwise thereof, after which the said end of the test piece is clamped to the support 17 by the bar 24 carried thereby. The weight is then removed. The test piece 29 will be in contact with the support 15, and will thus be held spanning the supports 14 and 15, as shown most clearly in Fig. 1. The support 15 has a hook 30 on one side thereof which is engageable with a pin or stud 31 projecting laterally from the support 17 to hold the support 17 in contact with the support 15 while the test piece 29 is being subjected to the tensile stress and during the clamping operation. In order to subject the test piece 29 to extra tensile stress, coil expansion springs 32 are employed, each of the springs 32 being received in recesses 33 and 34 respectively in the supports 15 and 17, as shown most clearly in Fig. 6. By releasing the hook 30 from engagement with the pin 31, the springs 32 come into play to exert the extra tensile stress on the test piece 29. The springs 32 exert a variable stress to compensate for variations in the strength of the material of the test piece during the wear or frictional action to which it is subjected.

The power and motion transmitting mechanism is employed for reciprocating the structure or carriage 11. This mechanism will include a suitable prime mover or electric motor (not shown), which drives a crank shaft 35 by means of a sprocket 36 fastened on the shaft 35 and a chain 37 which encircles the sprocket 36 and another sprocket on the motor shaft (not shown). The shaft 35 is supported for rotation in bearings 38 secured to the platform or table 10, and said shaft is held against axial movement by collars 39 on the shaft 35 and abutting the bearings 38 respectively. The shaft 35 has a crank 40 for each structure or carriage 11, and this crank 40 has connected therewith a pitman 41 which is pivotally connected as at 42 with the support 14 of the related carriage 11. The rotation of the shaft 35 by the power means will cause the structures or carriages 11 to reciprocate through the intervention of the cranks 40 and pitmans 41.

Each testing unit used also includes another structure 43 for supporting material to be tested which is so mounted with respect to the reciprocal structure or carriage 11 that under its own weight plus additional weight if desired presses the test piece carried thereby in frictional engagement with the test piece 29 between the ends of the latter while it is in motion. Each of the structures 43 includes a block 44 having arms 45 secured thereto at the opposite ends thereof respectively as at 46, so that the arms 45 project rearwardly from the block 44 in spaced relation. A pressure element 47 complemental to the block 44 is associated therewith for movement toward and away from the same by means of screw bolts 48 each of which is screwed into a tapped hole in the element 47, and each of which is loose in the block 44 and has a head 49 disposed in a bore 50 in the block 44 to limit the movement of the element 47 away from the block 44 and to prevent separation of the element 47 from the block 44. A coil expansion spring 51 surrounds each of the bolts 48 and is received in recesses respectively in the block 44 and element 47. (See Fig. 3.) The element 47 carries a hook 52 which is engageable with a pin or stud 53 on the block 44, to nullify the action of the springs 51. The element 47 has secured thereto a member 54 which provides a convex pressure face, said member being secured by screws 55. The structure 43 also includes means for holding a piece of material to be tested and also to maintain it under tensile stress lengthwise thereof in contact with the pressure member 54. The said means consists of clamping bars 56 and 57 respectively, the bars 56 being fixed to the front and rear sides of the block 44 respectively, and the bars 57 being provided with holes to accommodate bolts or studs 58 carried by the bars 56 at the opposite ends thereof respectively. A coil spring 59 surrounds each of the studs 58 and is received in recesses respectively in the bars 56 and 57. The studs 58 at the front of the block 44 have projecting threaded ends to receive wing nuts 60 respectively. The bar 57 at the rear of the block has the opposite ends thereof disposed respectively in slots 61 in the arms 45. A cam 62 is pivotally mounted on each of the arms 45 and is adapted to bear against the adjacent end of the related bar 57 to exert clamping pressure thereon in one position, and to release said bar in the other position. The bars 56 and 57 have on their opposing faces gripping means 63 similar to the gripping surfaces 26. Each of the arms 45 has a notch 64 opening through its rear end. An arbor 65 is secured in place transversely between the arms 45 by trunnion screws 66 adjacent the notches 64. Hook-shaped springs 67 are arranged in spaced relation on the arbor 65. One end of each spring is looped around the arbor 65 in a circular groove in the latter to prevent the springs from sliding along the arbor. The hook end of each spring is rolled as at 68 to facilitate the engagement of the spring for a purpose to appear. A shaft 69 is supported at its opposite ends by bearings 70 secured in place on the platform or table 10. The shaft 69 is held against axial movement by fixed collars 71 on the shaft 69 which engage the bearings 70 respectively. The shaft 69 provides a horizontal pivot or axis or fulcrum which is perpendicular to the guides 13. The notches 64 in the arms 45 make it possible to engage said arms 45 with the shaft 69, while the springs 67 are also engaged with the shaft 69. The arms 45 are engageable with fixed collars 71' on the shaft 69 to prevent the structures 43 from sliding on the shaft 69. Each of the structures 43 may thus be detachably connected with the shaft 69 for swinging or pivotal movement on a horizontal axis, so that said structure 43 under the influence of its own weight may exert a downward pressure. Each structure 43 may also be swung to an inactive position in which it is retained by the engagement of the arms 45 with a rod 72 supported at the opposite ends by bearings 73 secured to the platform 10. The rod 72 is held against axial movement by fixed collars 74 on the rod 72 in engagement with the bearings 73 respectively. The inactive position of each structure 43 is shown in dotted lines in Fig. 1. It will be apparent that each structure may be readily detached from the shaft 69 in order to arrange a piece of material to be tested thereon in a manner presently to be explained. The wing nuts 60 are adjusted and the cams 62 are swung to releasing positions so that the springs 59 move the clamping bars 57 to releasing positions with respect to the bars 56. One end of the piece of material to be tested is then arranged between the bars 56 and 57 at the rear of the block 54, whereupon the cams 62 are manipulated to cause them to exert pressure on the bar 57 to thereby clamp the test piece of material 75. The other end of the test piece 75 is then passed between the forward bars 56 and 57, and said end has connected therewith suitable means to subject the test piece to a desired tensile stress, whereupon the nuts 60 are adjusted to cause them to exert pressure on the forward bar 57 which in turn cooperates with the related bar 56 to securely clamp the end of the test piece 75 and hold it under tension in contact with the pressure member 54, as shown most clearly in Fig. 3. While this is being done the hooks 52 are engaged with the pins 53. When the hooks 52 are disengaged from the pins 53, the springs 51 come into play and cause member 54 to exert extra tension on the test piece 75, since the element 47 and the member 54 carried thereby will be free to move away from the block 44. Each structure 43 is so designed that the test piece 75 carried thereby will rest on the test piece 29 of its respective carriage 11. The test piece 75 will be maintained in frictional engagement with the test piece 29 between the ends of the latter at all times due to the limited reciprocal movement imparted thereto. In this manner both test pieces 29 and 75 will be subjected to a frictional or wearing action to determine the wear-resisting quality of the material.

In order to register or indicate the degree of wear to which the pieces 29 and 75 have been subjected in the operation of the machine, there is provided a device 76 in the form of a counter or odometer which is secured in place on the platform 10 adjacent one of the carriages 11. An oscillating arm 77 of the device 66 is operatively connected with a rod 78 having a downturned end 79. The rod 78 rests on a pin 80 in the support 14. On each rearward travel of the carriage 11, the pin 80 encounters the end 79 of the rod 78 which in turn operates the device 76. In this way the number of reciprocations of the carriage 11 will be registered in the device 76, thus indicating to a person the extent of action required to break down the structure of the material being tested in the machine.

If desired each block 44 may be provided with an upstanding peg 81 to accommodate one or more weights 82 to vary the frictional action and thus vary the conditions of the test. This is desirable in testing comparatively heavy fabrics.

It is to be understood that instead of subjecting similar pieces of fabrics to each other as shown, dissimilar pieces of material may be brought together to be tested.

Attention is called to the fact that the test piece 75 on each structure 43 may be readily inspected by swinging the structure to its inactive position as shown in dotted lines in Fig. 1, and this will also enable an inspection of the test piece 29. Due to the fact that each structure 43 may be detached, it is possible to quickly and easily apply a piece of material to be tested to said structure, and to remove it therefrom.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a testing machine, a movable base member, spaced upstanding supports on said base member, cooperative means on said supports to hold a test piece at the ends spanning said supports and exerting a constant tensile stress lengthwise of the test piece, and a structure having means to hold another test piece at its ends under a constant tension, said structure having means bearing on said last test piece between its ends, said structure being so mounted that under its own weight it presses the test piece carried thereby in frictional engagement with the first test piece between the ends of the latter.

2. In a testing machine, a slidable base member, means to constantly slide the base member back and forth, spaced upstanding supports on said base member, cooperative means on said supports to hold a test piece at the ends spanning said supports and exerting a constant tensile stress lengthwise of the test piece, a fixed element providing a horizontal axis, and a structure mounted for up and down pivotal movement on said fixed element, said structure having means to hold another test piece at its ends, and also having means bearing on said last test piece between its ends to put it under constant tension, said structure under its own weight pressing the test piece carried thereby in frictional engagement with the first test piece while the latter is being moved back and forth.

3. In a testing machine, a movable base member, spaced upstanding supports on said base member, and cooperative means on said supports to support a test piece at the ends spanning said supports and exerting a tensile stress lengthwise of the test piece, said means including a pivoted member, expansion springs bearing on said pivoted member, and a clamp on the pivoted member engaging one end of the test piece.

4. In a testing machine, a movable base member, spaced upstanding supports on said base member, a pivoted member on said base member adjacent one of said supports, expansion springs arranged between said pivoted member and the adjacent support, and clamps on said pivoted member and the remote support to hold a test piece at the ends spanning the supports and exerting a tensile stress lengthwise of the test piece.

5. In a testing device, spaced arms, a block secured between adjacent ends of said arms at one end of the device, a pressure exerting member, means connecting said member with said block at its under side for movement toward and away from the same, springs engaging said block and member constantly urging said member away from said block, means on opposite sides of said block to secure at the opposite ends a test piece of material in contact with said member, and the adjacent ends of said arms at the other end of the device having means to mount the device for up and down swinging movement.

CALVIN L. DENNIS.